United States Patent
Myhrberg et al.

(10) Patent No.: US 7,980,531 B2
(45) Date of Patent: Jul. 19, 2011

(54) VALVE HAVING FIRST AND SECOND FLUID PORTS

(75) Inventors: Lennart Myhrberg, Älvängen (SE); Håkan Samuelsson, Onsala (SE); Bertil Wejrot, Partille (SE)

(73) Assignee: Millipore AB, Solna (SE)

( * ) Notice: Subject to any disclaimer, the term of this patent is extended or adjusted under 35 U.S.C. 154(b) by 687 days.

(21) Appl. No.: 12/068,096

(22) Filed: Feb. 1, 2008

(65) Prior Publication Data

US 2008/0185552 A1    Aug. 7, 2008

(30) Foreign Application Priority Data

Feb. 2, 2007    (SE) .................................. 0700265

(51) Int. Cl.
*F16K 41/10*    (2006.01)
(52) U.S. Cl. .................. 251/214; 251/331; 251/335.2
(58) Field of Classification Search .............. 251/214, 251/331, 335.2, 337
See application file for complete search history.

(56) References Cited

U.S. PATENT DOCUMENTS

| | | | | |
|---|---|---|---|---|
| 2,638,307 A | * | 5/1953 | Fortune | 251/335.2 |
| 2,665,105 A | * | 1/1954 | Svabek, Jr. | 251/272 |
| 3,192,942 A | * | 7/1965 | Manor et al. | 251/214 |
| 3,371,676 A | * | 3/1968 | Mullaney, III | 251/214 |
| 3,485,473 A | * | 12/1969 | Fieni | 251/77 |
| 4,354,666 A | * | 10/1982 | McHale | 251/335.2 |
| 4,635,683 A | * | 1/1987 | Nielsen | 251/129.15 |
| 4,844,339 A | * | 7/1989 | Sayer et al. | 251/129.19 |
| 5,326,074 A | * | 7/1994 | Spock et al. | 251/214 |
| 2001/0022353 A1 | | 9/2001 | Takeda et al. | |
| 2002/0113223 A1 | | 8/2002 | Newberg | |
| 2005/0006617 A1 | * | 1/2005 | Leys | 251/335.2 |

FOREIGN PATENT DOCUMENTS

| | | |
|---|---|---|
| CN | 100381732 C | 4/2008 |
| DE | 299 19 298 U1 | 1/2000 |
| WO | WO 00/75541 A1 | 12/2000 |
| WO | WO 01/33126 A1 | 5/2001 |
| WO | WO 2005/008108 A2 | 1/2005 |

OTHER PUBLICATIONS

International-Type Search Report regarding application SE 0700265-2.

* cited by examiner

*Primary Examiner* — John Bastianelli
(74) *Attorney, Agent, or Firm* — Dickstein Shapiro LLP (57) ABSTRACT

A device in a valve (1) includes a valve housing (2) with at least a first (3) and a second (4) fluid port. A closure element (5) including a sealing portion (15) and diaphragm (30) is arranged in the valve housing (2). The sealing portion (15) is movable between an open position and a closed position. The closure element (5) and valve housing (2) form a flow passage (11) which communicates with the fluid ports when the sealing portion (15) leaves the closed position. A second sealing portion (14) is arranged in contact with a support portion (25) of the valve housing (2). An abutment element (16) is arranged in contact with the second sealing portion (14). The abutment element (16) transmits a force via the second sealing portion (14) toward the support portion (25) to provide a seal. The force is at least partly exerted by a spring element.

1 Claim, 12 Drawing Sheets

VALVE HAVING FIRST AND SECOND FLUID PORTS

FIELD OF THE INVENTION

The present invention relates to a device in a valve comprising a valve housing with at least a first and a second fluid port. A closure element is arranged in the valve housing, which closure element has a sealing portion and comprises a diaphragm. The sealing portion is movable along an axis of the closure element by said diaphragm between an open position and a closed position of at least one of the fluid ports of the valve housing. The closure element together with the valve housing forms a flow passage in the valve housing which communicates with said fluid ports when the sealing portion leaves said closed position. A second sealing portion of the closure element, which is an enclosing portion spaced from said axis, is arranged in contact with a support portion of the valve housing. An abutment means is arranged in contact along the periphery of said second sealing portion in such a manner that said second sealing portion is arranged between the support portion and the abutment means. The abutment means is arranged to transmit a force via said second sealing portion toward the support portion to provide a seal.

BACKGROUND ART

Valves of the above type are well known. Such valves are used in the first place in applications where high cleanness is required. Such applications can be various fluid engineering processes or process steps, for example for pharmaceutical and food technology purposes or other types of chemical purposes. Many fluid products are expensive and/or susceptible to contamination or dangerous in case of leakage, which means that leakage can result in an unhealthy environment for the user of a product or an environment. Tightness of a valve of the type stated above thus is crucial.

In valves of this type, a diaphragm element is operated between an open and a closed position. Fluid flowing in the valve housing can thus be easily and safely handled in an adjustable manner. The operation of the valve can take place in various ways, for example using manual or pneumatic control.

Furthermore, valves of this type should in their open position have good flow capacity without the valve being a substantial obstacle, thereby reducing the risk of the valve accumulating contaminants, such as dirt and deposits. The valve should also be absolutely tight. This condition may sometimes be difficult to achieve, for instance when using aggressive chemicals. In such cases, the sealing surfaces of the valve can be subjected to wear which results in, for instance, the material aging, becoming brittle and losing its elasticity, which may cause cracks and/or yielding and, later on, leakage.

There are thus many requirements that should be met by this type of valve, for instance good operability, good flow capacity, good tightness, sufficient cleanness.

In addition to these requirements, there are a number of ranges that should also be improved. These ranges of problems involve the following points that the valve ensures good sealing in spite of great variations in pressure and temperature of the fluid,
that the valve ensures good sealing in spite of any plastic deformation,
that the valve has good repeatability of sealing pressure when mounting the closure element.

In sealing, an elastic packing is usually compressed by prestressing a bolt. However, problems may arise after a while when the elastic material ages or is plastically deformed, which may result in leakage.

SUMMARY OF THE INVENTION

An object of the present invention therefore is to provide a device in a valve, which satisfies one or more of the above-mentioned points.

A further object is to provide a device which has a tightness adapted to the purpose.

This is achieved by the device in a valve stated by way of introduction comprising a valve housing with at least a first and a second fluid port, a closure element being arranged in the valve housing, said closure element having a sealing portion and comprising a diaphragm, the sealing portion being movable along an axis of the closure element by said diaphragm between an open position and a closed position of at least one of the fluid ports of the valve housing, the closure element together with the valve housing forming a flow passage in the valve housing which communicates with said fluid ports when the sealing portion leaves said closed position, a second sealing portion of the closure element, which is an enclosing portion spaced from said axis, being arranged in contact with a support portion of the valve housing, an abutment means being arranged in contact along the periphery of said second sealing portion in such a manner that said second sealing portion is arranged between the support portion and the abutment means, the abutment means being arranged to transmit a force via said second sealing portion toward the support portion to provide a seal, wherein said force is, at least partly, a force exerted by a spring means arranged in the device.

By fluid is meant in the first place liquids, liquid solutions, dispersions, suspensions etc. In the second place, fluid relates to gases, gas-liquid mixtures or gases in combination with one of the above. By spring means is meant spring assemblies with "mechanical resilience" and not compression of, for example, a packing made of an elastic material such as rubber, or the resilience which is provided with only one prestressed bolt.

Preferably, said spring means is selected from the group consisting of torsion springs and springs with a bending action.

A great advantage of a device according to the invention thus is that a certain pressure or sealing is continuously maintained independently of movements of the parts included in the valve due to temperature changes or cold flow/plastic deformation.

Preferably, said second sealing portion of the closure element has a sealing region and the valve housing has a complementary seat portion for mutual sealing.

Furthermore the sealing portion of the closure element is suitably operably connected by an actuator, the device having a coupling device, which has a locking means adapted to be arranged to the valve housing and an actuating device adapted to be connected to the coupling device to operate the actuator.

Further the actuator is preferably elongated and arranged in such a manner that its longitudinal axis coincides with said axis of the closure element and further arranged in an actuating hole through a hole in the coupling device.

In one embodiment, the abutment means is adjustably arranged in the coupling device by a thread bushing.

The thread bushing is suitably externally threaded and connected to the hole in the coupling device.

In one embodiment, a compression spring is arranged in such a manner as to generate a compressive force parallel to said axis.

In an alternative embodiment, a spring washer is arranged in such a manner as to generate a compressive force parallel to said axis.

In yet another alternative embodiment, the actual abutment means is a compression spring.

When the device is positioned as intended in an assembled valve, the abutment means will preferably abut against the closure element. Above all due to temperature changes, the various components included in the device change in size, which means that sealing over a long period can be improved by said spring force.

In one embodiment, the coupling device can be connected to the valve housing by a locking means. The coupling device has a connectable actuating device. The actuating device is in turn connected to the actuator to operate the valve.

The actuator is preferably centrally arranged in an actuating hole through a hole in the coupling device. As a result, the closure element can be operated in an easy and reliable manner.

The actuator is suitably a centrally arranged spindle, which at one end is connectable to the actuating device and, at its other end, is connectable to the closure element. This results in the advantage that the closure element can be operated in an easy and reliable manner.

The abutment means is preferably centrally axially adjustably arranged relative to the coupling device for applying the abutment means and toward the closure element. Furthermore the abutment means is suitably adjustably arranged in the coupling device by a thread bushing. The thread bushing is advantageously externally threaded and connected to the hole in the coupling device. Thus the valve obtains a good adjustable and controllable capability between the abutment means and the closure element.

The closure element preferably is made of an at least partly flexible and rigid material. This means that the closure element obtains the desired sealing properties that are required in the application concerned.

By flexible material is in the first place meant a bendable and bulgeable material having a resistance adapted to function and application.

The closure element can be made of, for example, a resilient soft material. The closure element will thus have the sealing properties that are required in the application concerned.

The closure element is suitably curved radially inward adjacent a passage portion which together with the inside of the valve housing forms a cavity when the closure element is closed. Thus, the valve obtains good flow capacity when the closure element leaves the closed position.

The abutment means can be made of, for example, a soft material. In addition, the abutment means can be exchanged if required by the valve application.

An upper end of the closure element is preferably radially spaced from the inner wall of the valve housing in the mounted state. This results in the advantages that the upper end of the closure element, in this case, does not abut against the side walls of the valve housing, which in that case would cause a risk of resistance in mounting and operation.

The closure element is preferably adapted to be applied to a support portion, which at least partly extends peripherally in the valve housing. The closure element flexes, for example about a seat portion in operation. Consequently, the valve obtains both the intended sealing function and the required operating function for the valve to work as desired.

The closure element can, for example, maintain the open position when no actuating forces act on the closure element. The closure element can in this way be retained in the open position without being subjected to any great stress that could result in wear.

BRIEF DESCRIPTION OF THE DRAWINGS

The invention will in the following be described with reference to the accompanying drawings, which by way of example illustrate preferred embodiments of the invention.

DESCRIPTION OF PREFERRED EMBODIMENTS

Figure 1:
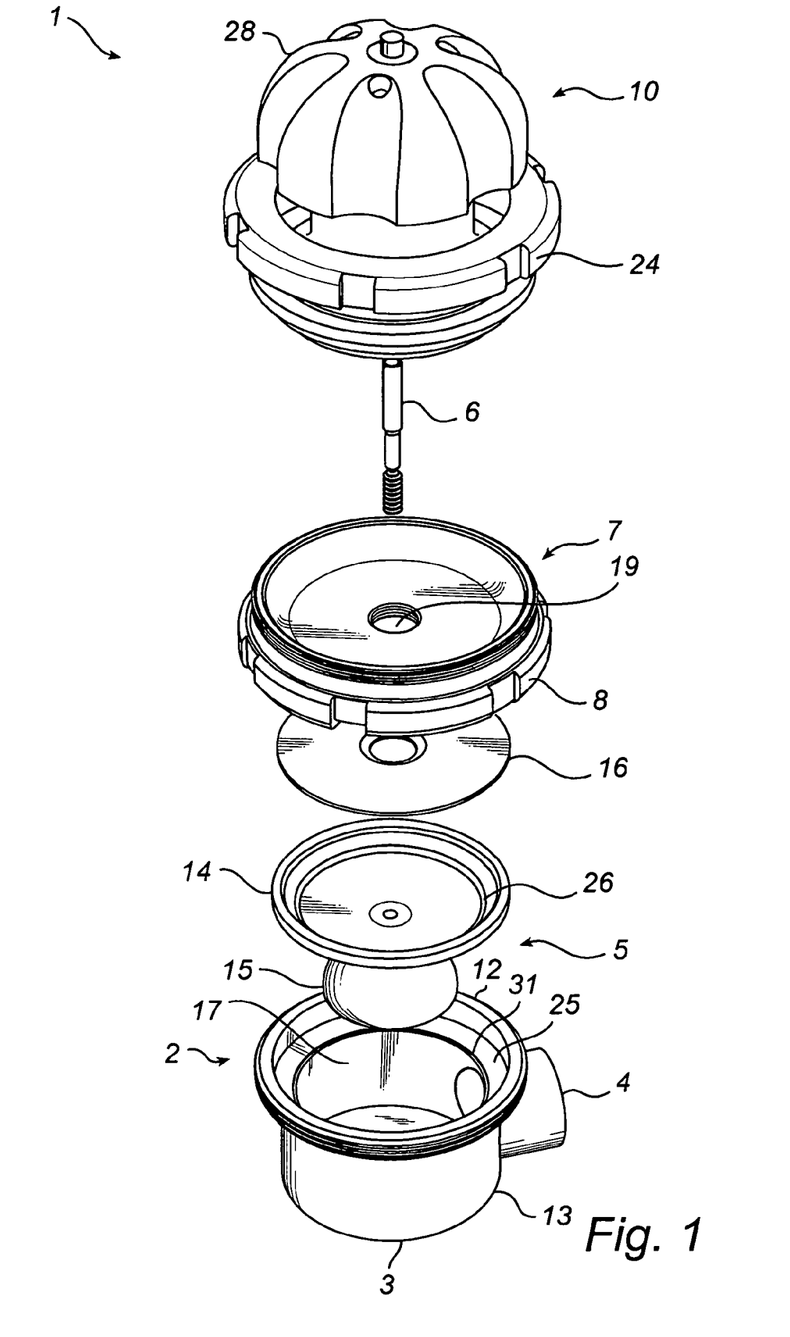
FIG. 1 is a schematic exploded view of a device in a valve according to a first embodiment of the invention.

FIG. 1 illustrates a valve 1 with a device according to a first preferred embodiment of the invention. The valve 1 comprises a valve housing 2 of prior art type, which has an internal, preferably cylindrical cavity. The valve housing has at least a first fluid port 3 and a second fluid port 4. The first fluid port 3 is preferably arranged in a lower portion 13 of the valve housing and suitably forms an inlet port, see FIG. 1. The second fluid port is preferably arranged in the side wall of the valve housing 2 and suitably forms an outlet port.

Figure 2:
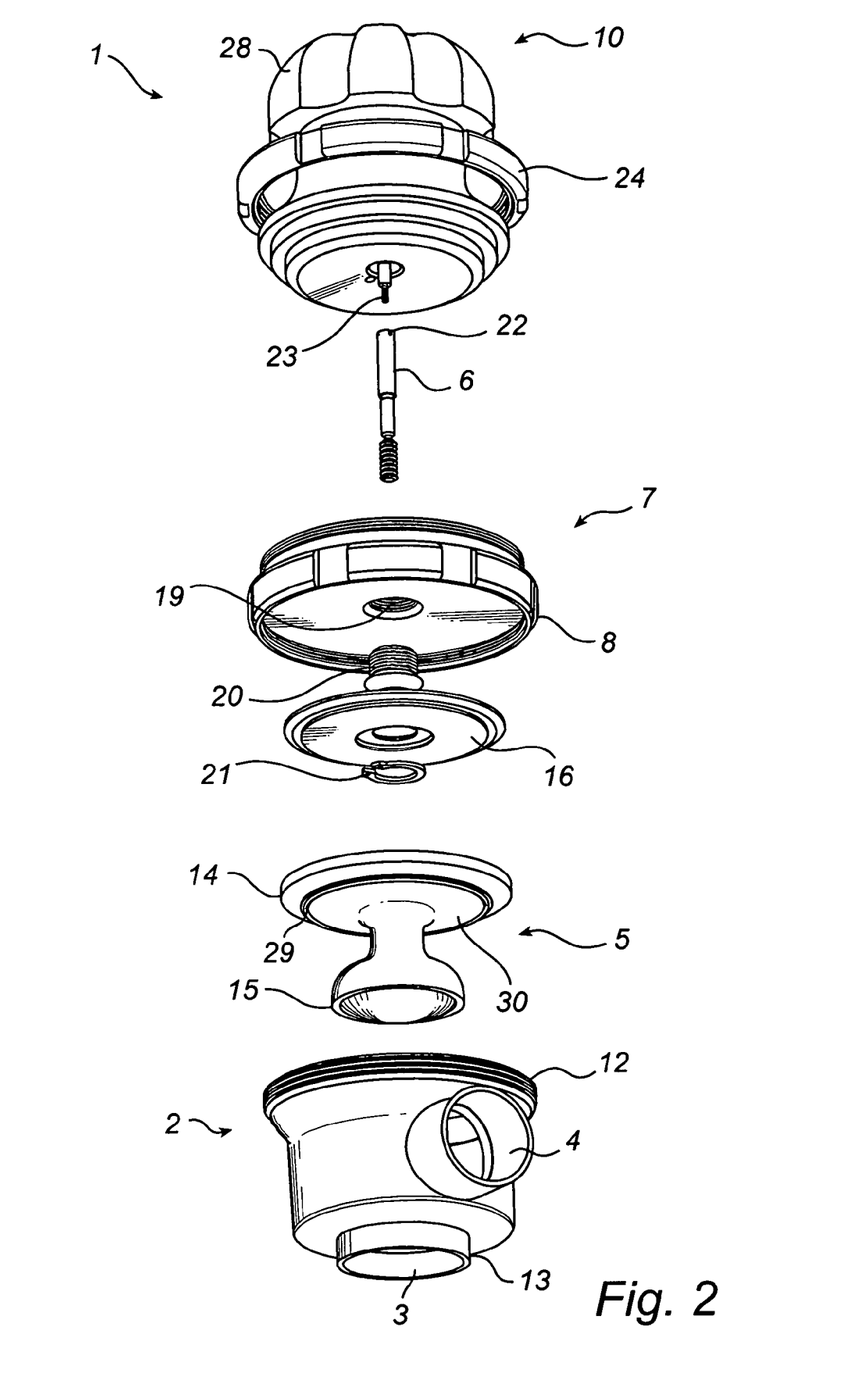
FIG. 2 is a schematic exploded view, seen in perspective from below, of the device in FIG. 1.

A preferably movable closure element 5 is adapted to be arranged in the cavity of the valve housing 2. The closure element is preferably rotationally symmetrical with an upper end, a sealing portion 14, adapted to an upper portion 12 of the valve housing 2. The closure element 5 has another sealing portion 15, in this embodiment a lower end, which is adapted to a lower portion 13 of the valve housing 2 to be mutually sealable adjacent the first fluid port 3 in use. With reference to FIG. 2, the central portion of the closure element 5 between said ends has a preferably waist-like shape which is adapted to a passage portion 11 adjacent the second fluid port 4.

Figure 3:
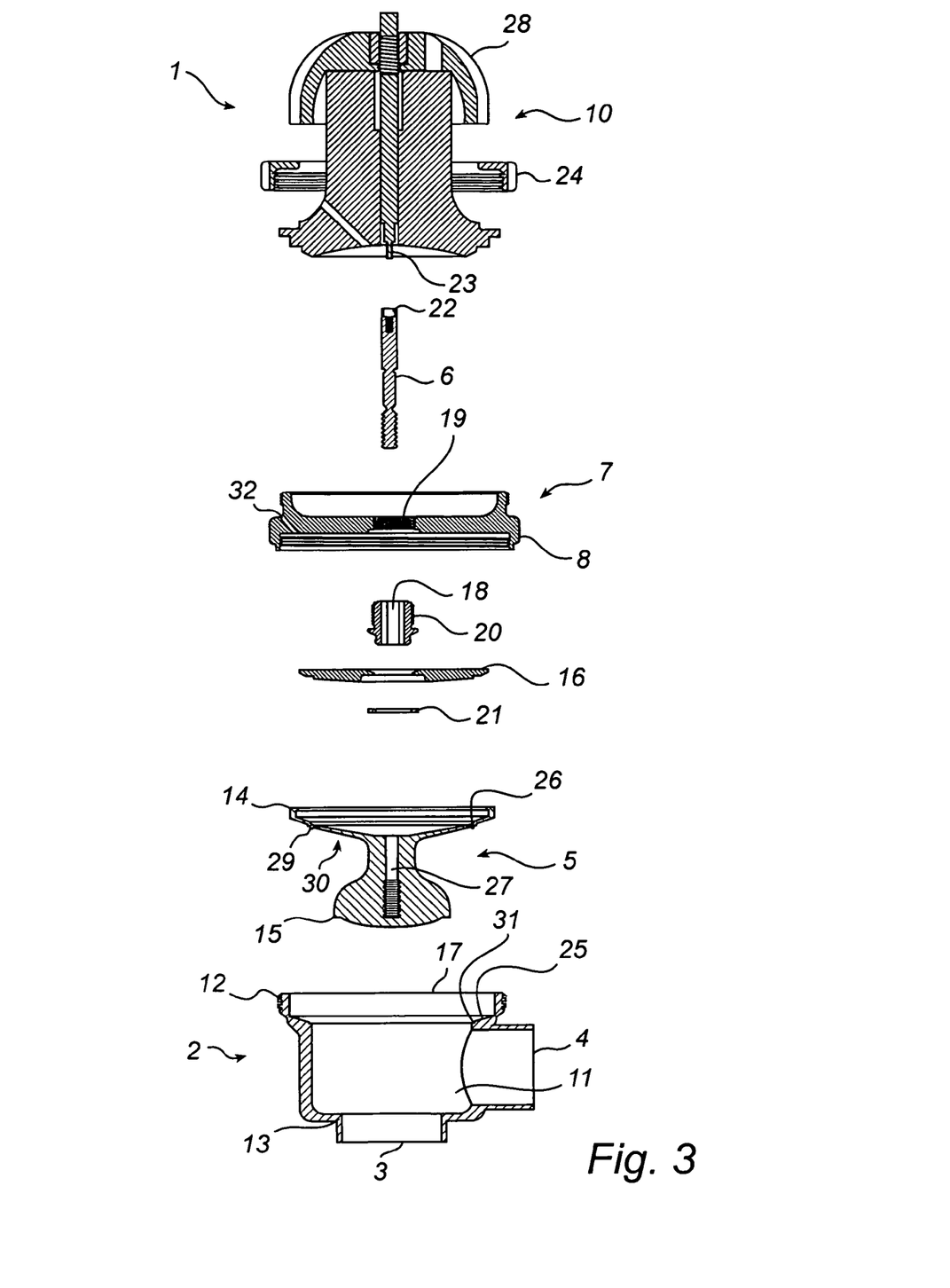
FIG. 3 is a schematic exploded view of a longitudinal section of the device according to FIG. 1 or alternatively FIG. 2.

With reference to FIG. 3, the closure element 5 has a second sealing portion 14, in this embodiment an upper end, suitably a hole 27 which extends in the axial direction, downward, into the closure element 5. The hole 27 in the closure element is, for instance, internally threaded, which is intended for a connectable actuator 6. The closure element also has at its upper end a sealing region 29 which extends circumferentially with an edge inward toward the valve housing 2. The closure element 5 also has a flexible portion 30 which is radially inside said sealing region 29.

Referring once more to FIG. 2, the valve housing 2 has in its upper portion 12 a connection opening 17. The upper portion 12 of the valve housing 2 is adapted to be connected to a coupling device 7. The coupling device 7 is preferably connectable to the valve housing 2 by a locking means 8. The locking means 8 is suitably provided with an internal thread, which is adapted to a complementary external thread of the valve housing 2 for mutual locking.

With reference to FIG. 3, the coupling device 7 also suitably has a centrally arranged hole 19 which is provided with an internal thread. The hole 19 is adapted to receive a thread bushing 20 provided with an external thread. The upper end of the thread bushing 20 is preferably connectable to the hole, (see FIG. 2).

The lower end of the thread bushing 20 is suitably provided with an abutment means 16 which is fastened to be rotatable on the thread bushing. The abutment means 16, which is to be seen in FIG. 2, is arranged inward toward the valve housing. The thread bushing 20 has preferably at its lower free end a locking washer 21 for retaining the abutment means in the intended position.

With reference to FIG. 3, the thread bushing 20 has a hexagonal actuating hole 18 intended for an Allen key. The thread bushing 20 with the rotatably connected abutment means 16 thus is axially adjustable relative to the coupling device 7 in its threaded hole 19.

Referring once more to FIG. 3, it is to be seen that the elongated actuator 6 in its lower end preferably is provided with an external thread to be connected to the hole 27 of the closure element 5. Furthermore the actuator 6 is in its upper end suitably provided with an internal thread to be connected to and receive an actuating device 10 with an externally threaded pin 23. The actuator 6 is to be inserted through the hexagonal actuating hole 18 in the thread bushing 20 for the intended connection of the actuator at both ends. The upper end of the actuator can also be provided with a diametrical groove 22 which is used to allow a complementary tool (not shown) to adjust the connection of the actuator 6 to the closure element 5.

The actuating device 10 is preferably connectable to the coupling device 7 by an annular fastening means 24. The fastening means 24 is suitably provided with an internal thread which is adapted to a complementary external thread of the coupling device 7 for interconnection.

The actuating device can be actuated by manual or pneumatic, hydraulic or electrical control or alternatively a combination thereof.

The valve housing 2, the coupling device 7, the abutment means 16 and the actuator 6 are preferably made of metal, such as stainless steel or aluminium, but may, of course, be made of other materials or combinations of materials that meet the requirements and wishes according to the intentions of the invention. The thread bushing 20 is suitably made of metal, such as bronze, in order to ensure easy operation of the same and, for instance, allow low friction.

The closure element 5 according to the first embodiment is preferably made of a flexible polymer, such as Teflon, polytetrafluoroethylene (PTFE).

The closure element 5 may, of course, be made of other materials that meat the requirements and wishes of the invention, such as rubber or a combination of PTFE and rubber.

The requirements and wishes as to materials that can be placed on the invention may, for example, be chemical resistance, temperature and pressure resistance. These materials and material needs may, of course, be varied in view of the application concerned.

Components such as the interior of the valve housing 2, the fluid ports 3, 4, the closure element 5, the actuator 6, the coupling device 7, the abutment means 16 and the connection opening 17 are substantially circular in cross-section, but may of course have a different shape as long as the objects and requirements of the invention are met. Other conceivable shapes can be oval, square or some kind of regular or irregular polygonal shape.

The mounting of the valve 1 and the other components will now be described in the following with reference to FIGS. 3, 4a and 4b.

As mentioned above, the valve housing 2 has a connection opening 17 in the upper portion 12 of the valve housing, see FIG. 3. In its upper inside, the valve housing 2 preferably has a support portion 25 and a seat portion 31. The closure element 5 is insertable through the connection opening 17, an outer radial portion at the upper end of the closure element abutting against the support portion 25.

With reference once more to FIG. 3, the closure element has preferably at its upper end an edge portion 26 where the closure element 5 has an indentation with a peripheral edge. It is to be noted that the upper end, the sealing portion 14, of the closure element 5 in its mounted state preferably is arranged, suitably in a floating manner, at a small radial distance from the inner wall of the valve housing 2.

The abutment means 16 is connected to the lower end of the thread bushing 20 suitably by means of the locking washer 21. The upper end of the thread bushing is screwed from below into the internally threaded hole 19 of the coupling device 7. Thus the abutment means 16 is adjustably connected to the coupling device 7 on the underside thereof by the thread bushing 20. During mounting, the abutment means is in its upper position so as to abut against the underside of the coupling device, which is seen in FIG. 4a.

As shown in FIG. 3, the coupling device 7, with the integrated components stated above, is connected to the upper portion 12 of the valve housing 2 by the locking means 8.

The locking means 8 is preferably an annular nut means. An appropriate tool (not shown) thus suitably performs the connection so that the locking means 8 and the upper valve housing portion 12 abut against each other in a reliable manner.

Figure 4A:
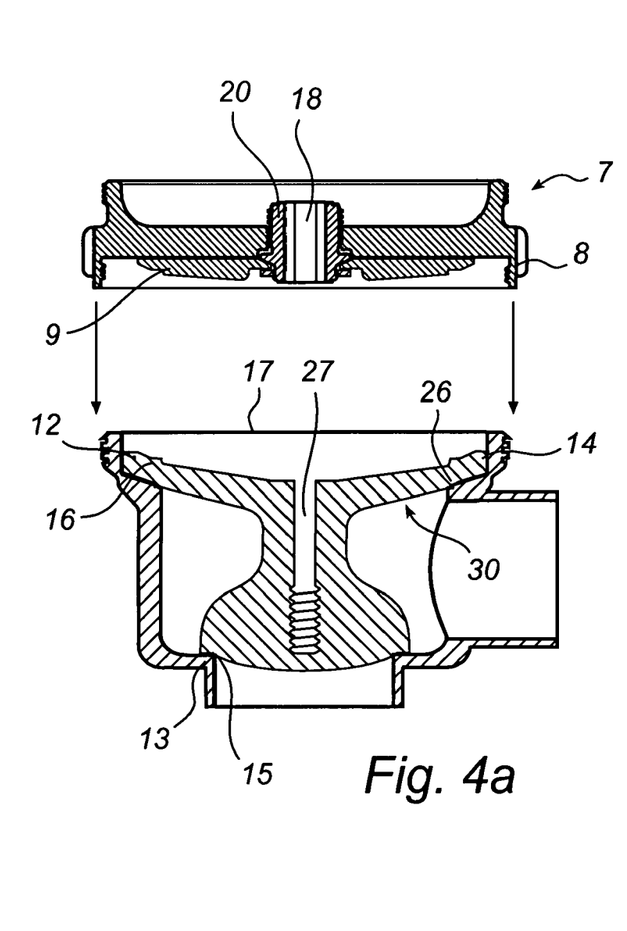
FIG. 4a shows a part of a device in a valve, according to FIG. 1, in the mounted state, illustrating a mounting position.
Figure 4B:
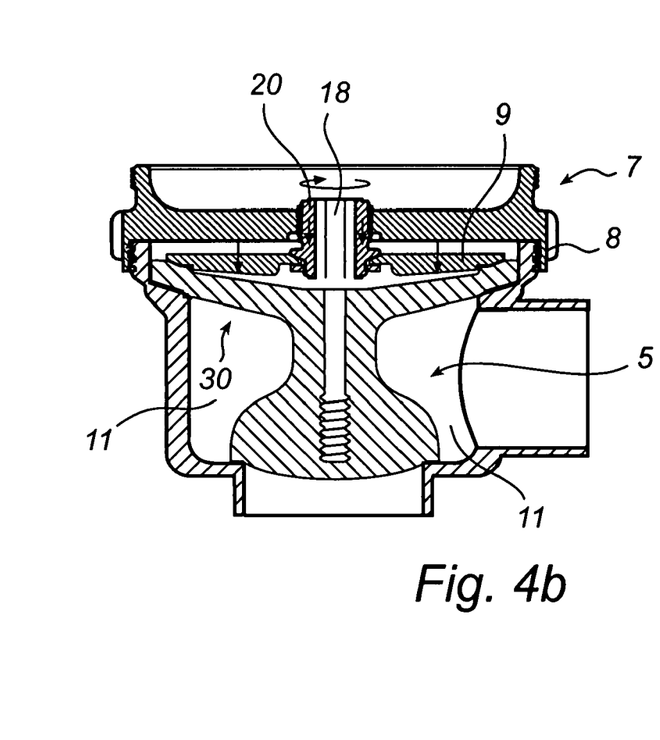
FIG. 4b shows a part of a device in a valve, according to FIG. 1, in the mounted state, which illustrates a press-fit position.

With reference to FIGS. 4a and 4b, it is to be seen that the thread bushing 20 can be adjusted with the hexagonal actuating hole 18 by means of an Allen key so that the abutment means is adjusted to abut with a press-fit against the closure element 5.

The Allen key can advantageously be what is referred to as a torque wrench, which ensures that a similar adjusted torque is applied in each press-fit operation which, for example, takes place in connection with maintenance.

With reference to FIG. 3, the actuator 6 is inserted into the actuating hole 18 and screwed into the closure element 5 by means of an appropriate tool (not shown) which engages in the diametrical groove 22 of the actuator 6.

After that, the actuating device is arranged over the coupling device and rotated so that the pin 23 is threaded into the upper portion of the actuator 6. The fastening means 24 of the actuating device 10 is then attached by screwing and tightened with an appropriate tool (not shown).

In addition to this description of mounting, the respective fluid ports are of course connected to fluid lines, but since this takes place according to prior art technique and is not a direct part of the invention, this operation is left out of the description.

The function of the valve 1 and the other components will now be described in the following with reference to FIGS. 4a, 4b and 5a, 5b respectively. When a mounted device in the valve 2 according to the present invention is arranged in the intended position, for instance, adjacent a fluid tank for directing the fluid flow, for example the first fluid port 3 of the valve is connected to the lower portion of the fluid tank as an inlet of the valve. The second fluid port 4 of the valve is connected to a fluid line as an outlet of the valve.

Figure 5A:
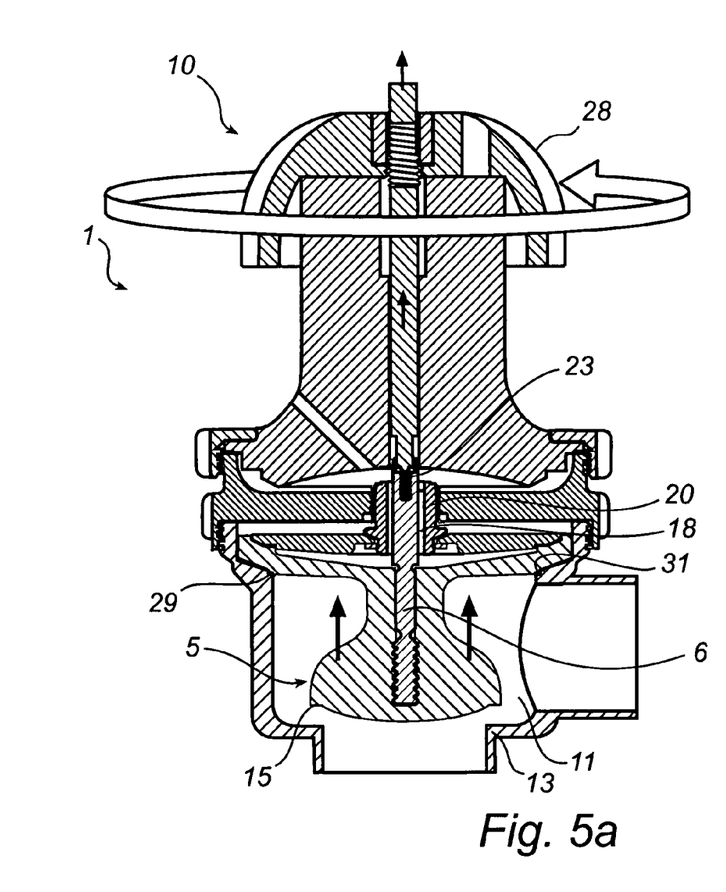
FIG. 5a is a longitudinal section of a device in a valve according to FIG. 1, in the mounted state, illustrating an open position.
Figure 5B:
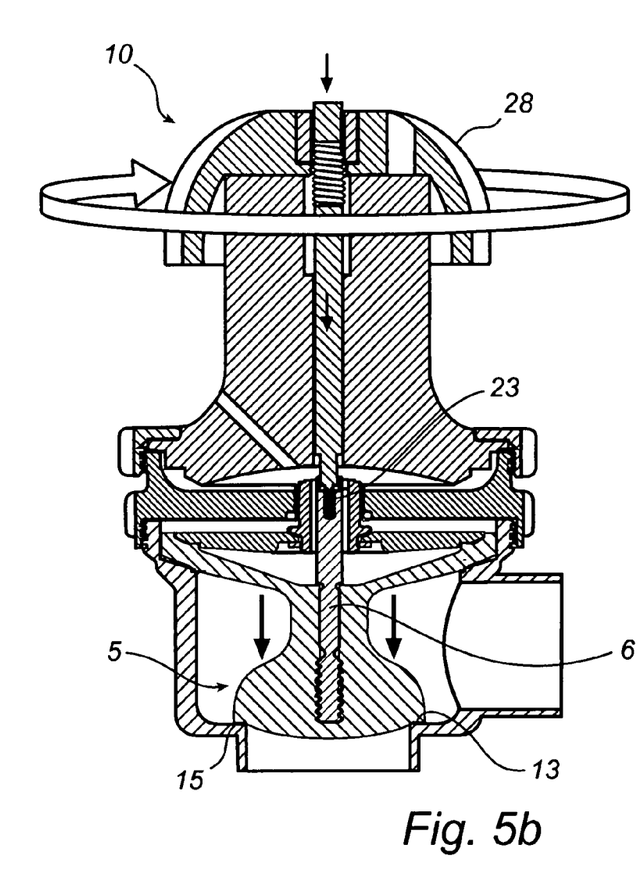
FIG. 5b is a longitudinal section of a device in a valve according to FIG. 1, in the mounted state, illustrating a closed position.

When a user intends to open the valve 2 provided with a manual actuating device 10, he turns a handle 28, see FIGS. 5a, 5b. With the handle, the pin 23 is moved in the axial direction from the tank connection of the valve (below referred to as off direction). The pin 23 actuates the actuator 6 through the actuating hole 18 in the same off direction.

Due to the movement of the actuator 6, the closure element 5 moves in the same off direction, see FIG. 5a. The end, the sealing portion 15, of the closure element thus leaves the abutment surfaces of the first fluid port. Any fluid in the tank may thus, for instance due to gravity, flow through the valve. The end, the sealing portion 15, of the closure element, and its waist portions together with the inner walls of the valve housing 2 between the first 3 and the second fluid port 4 form the flow passage 11. The fluid can now flow from the first fluid port 3 through the flow passage 11 to the fluid port 4.

Correspondingly, but in the opposite direction, the closing process of the valve takes place when the handle of the actuating device is turned to the closing position, whereby the first fluid port 3 is again closed, see FIG. 5b. It is to be noted that in the first embodiment the preferably rigid closure element 5 suitably flexes about the seat portion 31 when operating the positions of the valve.

In operation, the coupling device 7 ensures that the sealing region 29, together with the seat portion 31 of the valve housing, under the action of the abutment means 16 has the required sealing function. In order to demonstrate leakage in this seal, an indication passage 32 is arranged in the coupling device 7, see FIG. 3.

With reference to FIGS. 4a, 4b and the above description of mounting, the following occurs when the thread bushing 20 is, for example, adjusted by an Allen key in the hexagonal actuating hole 18. This can preferably occur without the actuator being mounted.

When the abutment means 16 is moved toward the closure element 5, a preferably uniformly distributed force is peripherally applied between the above components for mutual sealing. This force is suitably transmitted centrally by the thread bushing 20 as force-transmitting means. This single adjusting means results in adjustment being achieved in a simple and uniform manner. In the valve housing 2, the support portion 25 and the seat portion 31 act as an abutment for the closure element so that the abutment means 16 obtains the desired function. In the opposite direction, the coupling device 7 together with the thread bushing 20 acts as an abutment for the press-fit force exerted by the abutment means 16.

The abutment means 16 preferably exerts a pressure, at a suitable radial distance from its centre, on the closure element 5 adjacent the edge portion 26. This distance is adjusted so that the closure element 5 can flex adjacent the flexible portion 30 for actuating the valve 1. In other words, the closure element has adjacent said portion 30 at the end, the sealing portion 14, some freedom of movement so that the closure element can move in the intended vertical direction.

The abutment means 16 preferably abuts on both sides of the edge portion 26 of the closure element 5 to ensure adequate abutment. This press-fit abutment force results in the desired sealing function between the sealing region 29 and the seat portion 31. The invention according to the second embodiment will now be described. The closure element 5 has a shape which is preferably adapted to the abutment means 16. The closure element 5 according to the second embodiment is suitably made of a resilient soft material, such as silicone, ethylene-propylene rubber (EPDM), fluorinated rubber (FPM; viton).

The closure element 5 can, of course, be made of another material which has the properties that are required according to the intentions of the invention.

The above closure element 5 can have, for example, a metal core which is directly or indirectly connectable to the actuating device 10. The closure element 5 preferably has good sealing properties independently of pressure and temperature changes, the abutment means 16 being pressed directly against the closure element 5, whereby sealing occurs between the sealing region 29 and the seat portion 31.

In FIGS. 1-5, the abutment means 16 is a resilient washer. The subsequent figures illustrate alternative spring means in the different embodiment of the valve.

Figure 6A:
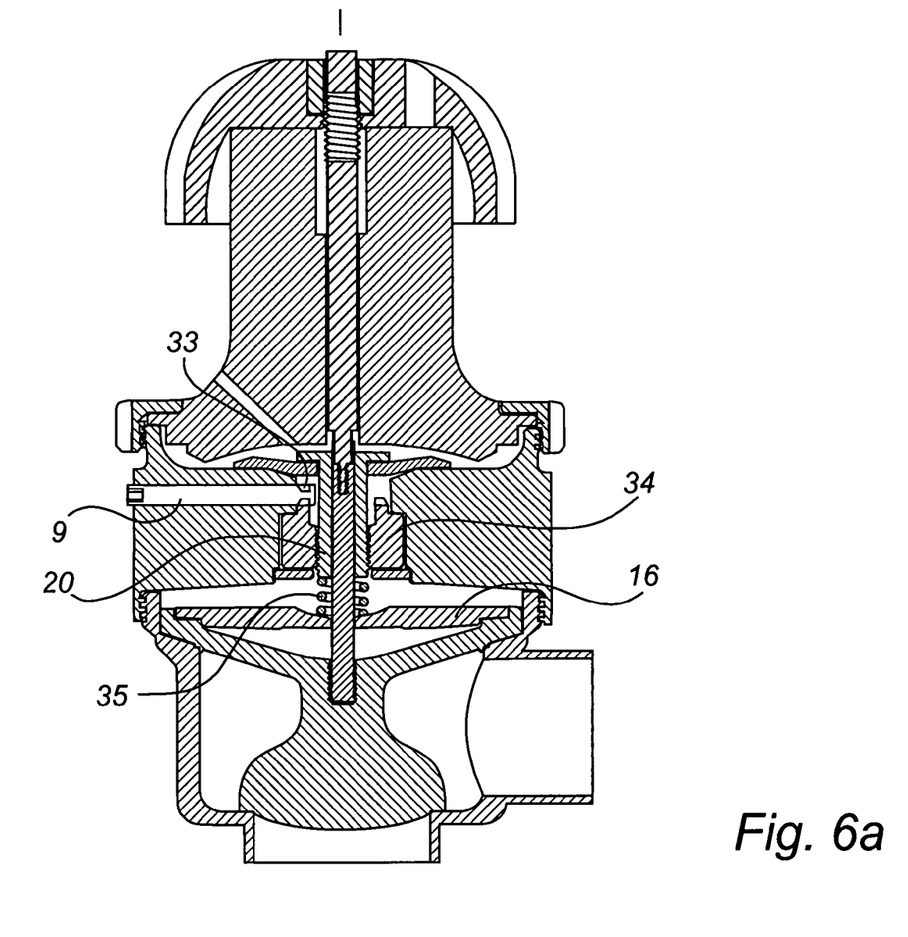
FIGS. 6a-6c illustrate an alternative embodiment of the device according to the present invention.
Figure 6B:
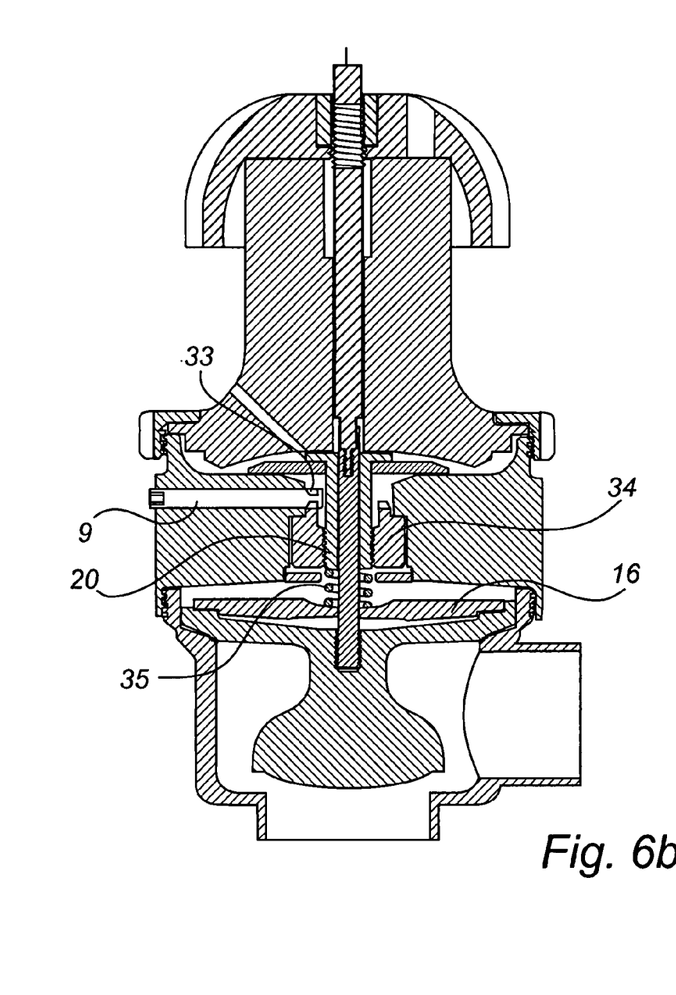
Figure 6C:
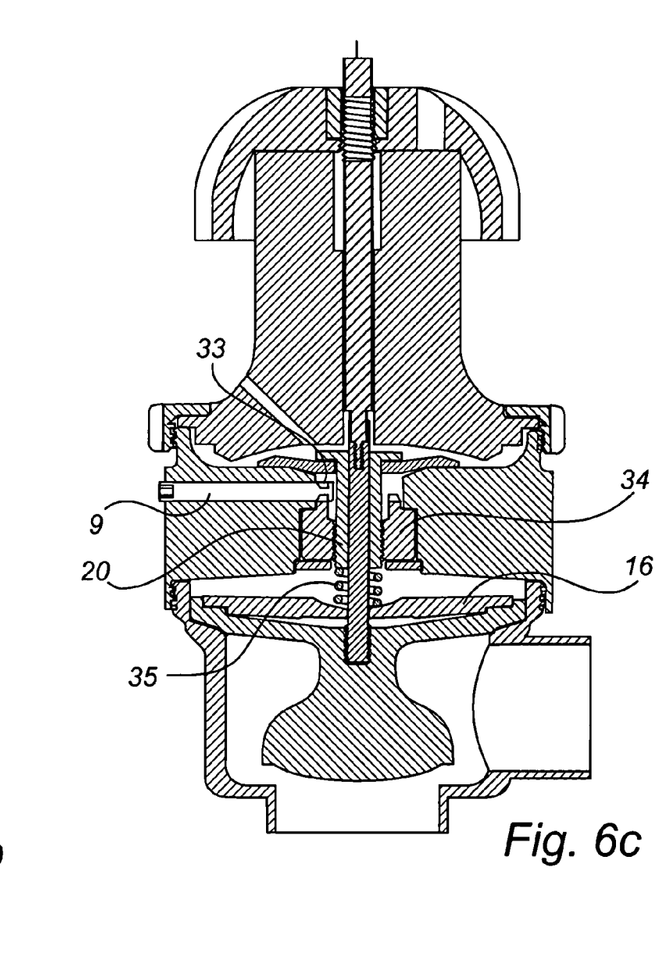

FIGS. 6a-6c illustrate an alternative embodiment of the device according to the present invention. The abutment means 16 is pressed against the closure element 5 by a compression spring 35, which ensures that a pressure is exerted by the abutment means 16 on the closure element 5 in changes of the size of the parts included in the device. FIG. 6a shows the valve in the closed position, and FIGS. 6b and 6c in the open position. In FIG. 6c, the spring 35 is slightly more tensioned than in FIG. 6b. The compression of the spring 35 is in this embodiment performed by an adjusting screw 9, a worm gear 33, a nut 34 and the thread bushing 20. An advantage of this embodiment is that the spring 35 can be tensioned without necessitating dismounting of any part of the valve.

Figure 7A:
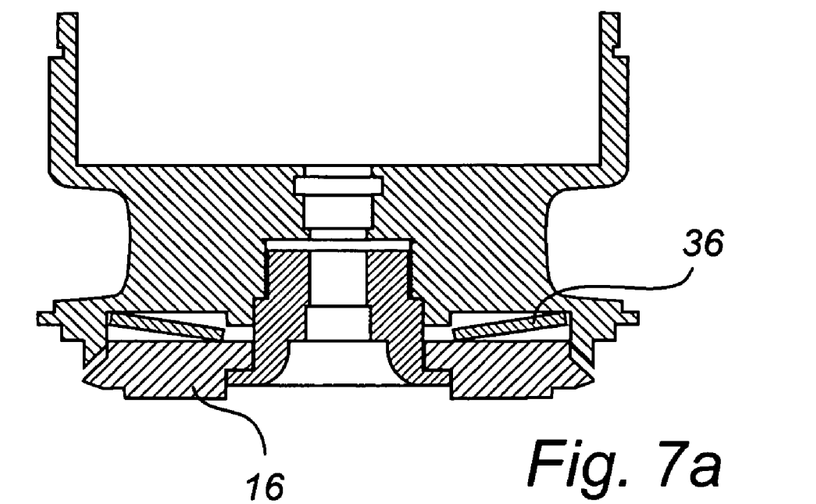
FIGS. 7a and 7b illustrate another embodiment of the device according to the present invention.
Figure 7B:
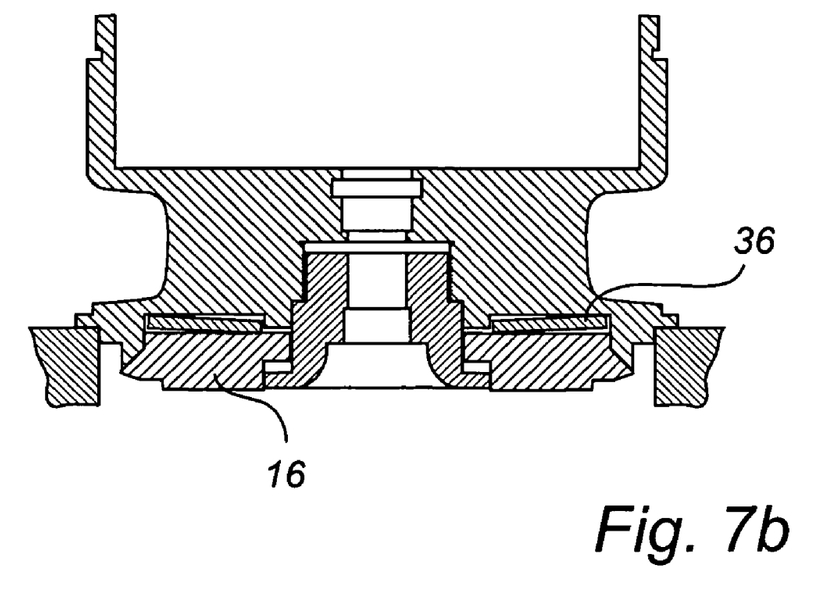

In FIGS. 7a and 7b, which illustrate a further embodiment of the device according to the present invention, the abutment means comprises a spring washer 36 which just like the compression spring 35 in FIGS. 6a-6c ensures that a pressure is exerted by the abutment means 16 on the closure element 5 in changes of the size of the parts included in the device. FIG. 7a shows the device in one position with a large expansion gap, and FIG. 7b in another position with a small expansion gap.

Figure 8A:
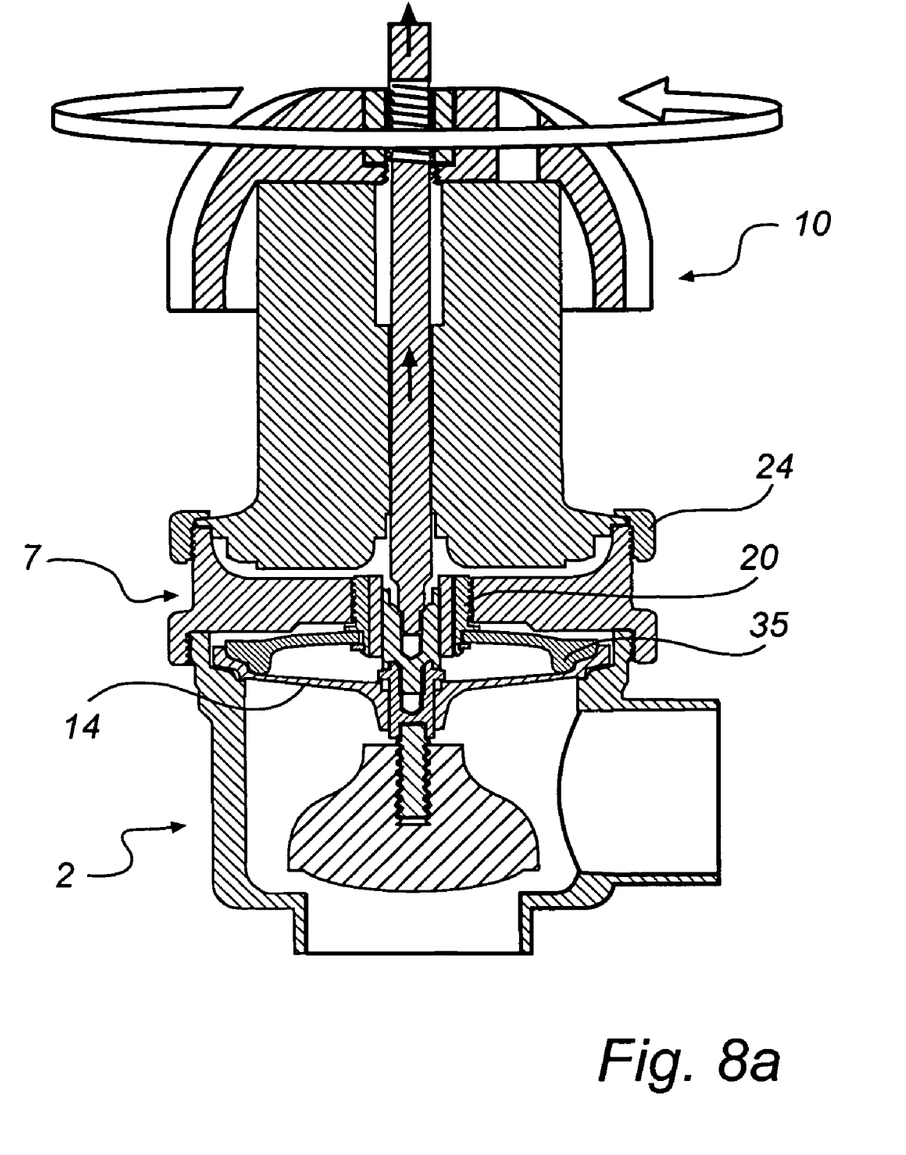
FIGS. 8a and 8b illustrate another alternative embodiment of the device according to the present invention.
Figure 8B:
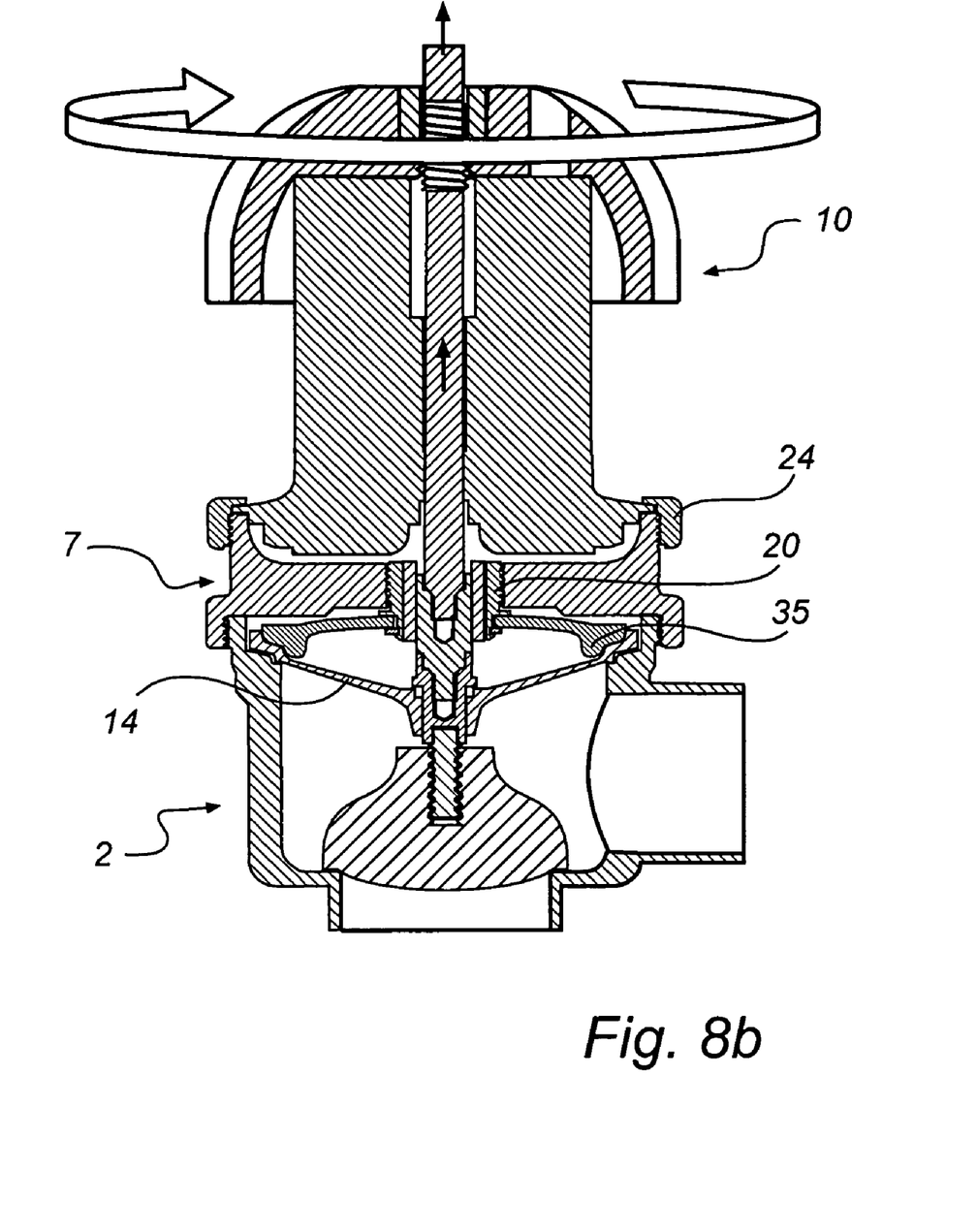

Yet another alternative embodiment of the device according to the invention is shown in FIGS. 8a (open valve) and 8b (closed valve). In this embodiment, the abutment means is a compression spring 35, which is to be tensioned by the thread bushing 20. In this embodiment, the "cone" is shown as a separate part which is arranged by means of a bolt with the diaphragm part of the closure element 5.

Figure 9:
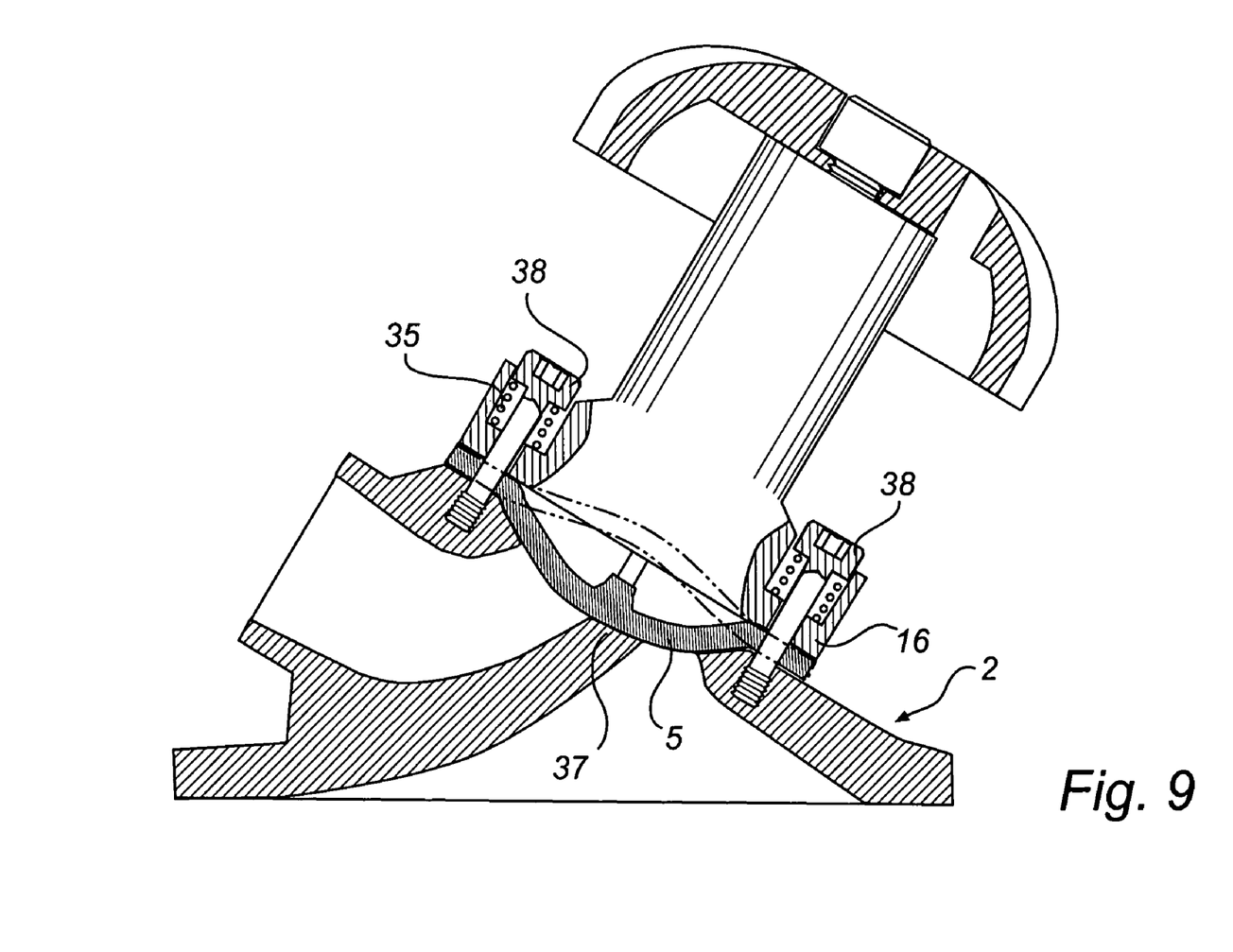
FIG. 9 shows yet another embodiment of the device according to the present invention.
Figure 10:
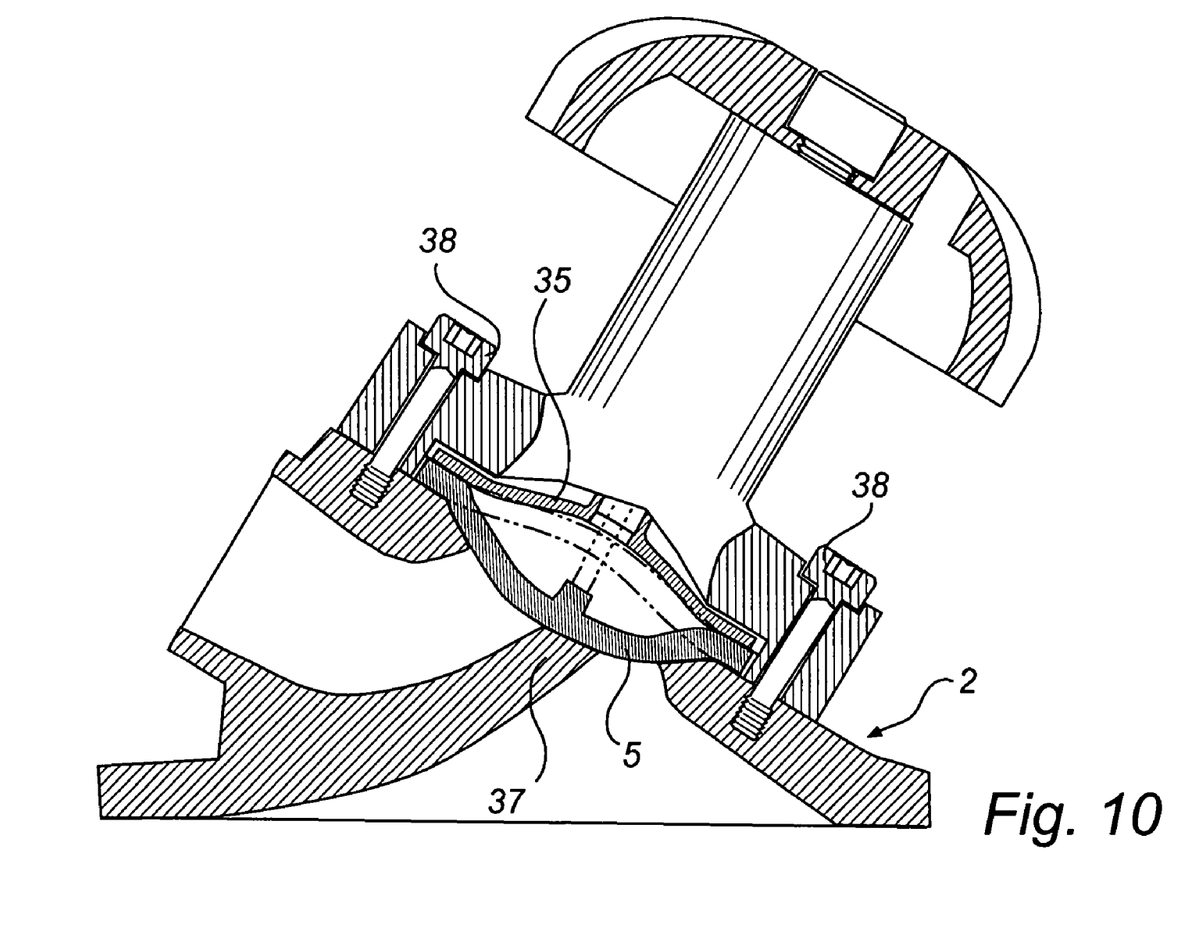
FIG. 10 shows a further embodiment of the device according to the present invention.

Another embodiment of the device according to the present invention is shown is FIG. 9, where the closure element 5 largely consists of a diaphragm which is pressed down against a ridge 37 belonging to the valve housing 2 in order to close the valve. The diaphragm 5 is sealed against the valve housing 2 by a number of bolts 38 holding an abutment means 16 against the peripheral portions of the diaphragm. In addition, a spring 35 is arranged adjacent each bolt to maintain a minimum sealing force independently of the movements of the components due to temperature. FIG. 10 shows the same valve as in FIG. 9 but with an alternative spring action involving an abutment means which at the same time is a compression spring 35. The compression spring 35 is pressed down against the diaphragm 35 by an adjustable means (not shown) close to the centre of the compression spring 35.

It will be appreciated that the above described embodiments of the present invention can be modified and varied by as person skilled in the art, without departing from the inventive concept defined in the claims. For instance, the valve and its components according to the present invention with the various fastening means, locking means, thread bushings can, of course, be provided in various ways such as detachable joints (for instance screw, spline, key, clamp, press and shrink joints) or alternative other elastic joints or power joints, but also in some applications, permanent joints (weld, glue and rivet joints). It goes without saying that it is also possible to combine the various spring alternatives. For example, the valve with its components may consist of several parts both as separate or composite components, such as several fluid ports, valve housings, closure elements, abutment means, coupling devices, thread bushings. The above-mentioned components can also be integrated when convenient and when allowed by the application.

REFERENCE NUMERALS 1. valve
2. valve housing
3. first fluid port, fluid opening
4. second fluid port, fluid side opening
5. closure element
6. actuator
7. coupling device
8. locking means (coupling device)
9. adjusting screw
10. actuating device
11. flow passage, passage portion
12. upper portion valve housing
13. lower portion valve housing
14. sealing portion
15. sealing portion
16. abutment means; abutment portion
17. connection opening
18. actuating hole
19. hole coupling device
20. thread bushing
21. locking washer
22. groove in actuator
23. pin actuating device
24. fastening means (actuating device)
25. support portion (valve housing)
26. edge portion
27. hole in closure element
28. handle (actuating device)
29. sealing region
30. flexible portion
31. seat portion
32. indication passage
33. worm gear
34. nut
35. compression spring
36. spring washer
37. ridge
38. bolt

The invention claimed is:

1. A device in a valve comprising:
a valve housing with at least a first and a second fluid port;
a closure element being arranged in the valve housing, the closure element having a sealing portion and comprising a diaphragm, the sealing portion being movable along an axis of the closure element by means of said diaphragm between an open position and a closed position of at least one of the fluid ports of the valve housing, the closure element together with the valve housing forming a flow passage in the valve housing which communicates with said fluid ports when the sealing portion leaves said closed position, a second sealing portion of the closure element adapted to come in contact with a support portion of the valve housing; and
an abutment means being arranged in contact along a periphery of said second sealing portion in such manner that said second sealing portion is arranged between the support portion and the abutment means, the abutment means being arranged to transmit a force via said second sealing portion towards the support portion to provide a seal, and wherein said abutment means comprises a spring means,
wherein the sealing portion of the closure element is operably connected to an actuator, the device further having a coupling device which has a locking means adapted to be connected to the valve housing, and an actuating device adapted to be connected to the coupling device to operate the actuator,
wherein the abutment means is adjustably arranged in the coupling device by means of a thread bushing, and
wherein the thread bushing is externally threaded and connected to a recess in the coupling device.

* * * * *